United States Patent
Bryant et al.

(10) Patent No.: US 9,558,039 B2
(45) Date of Patent: *Jan. 31, 2017

(54) MANAGING RESOURCES OF A SHARED POOL OF CONFIGURABLE COMPUTING RESOURCES

(71) Applicant: International Business Machines Corporation, Armonk, NY (US)

(72) Inventors: Jay S. Bryant, Rochester, MN (US); Bin Cao, Rochester, MN (US); James E. Carey, Rochester, MN (US); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,109

(22) Filed: May 21, 2015

(65) Prior Publication Data

US 2016/0266931 A1    Sep. 15, 2016

Related U.S. Application Data

(63) Continuation of application No. 14/657,218, filed on Mar. 13, 2015.

(51) Int. Cl.
    *G06F 9/46*    (2006.01)
    *G06F 9/50*    (2006.01)
    *G06F 9/48*    (2006.01)

(52) U.S. Cl.
    CPC .......... *G06F 9/5011* (2013.01); *G06F 9/4881* (2013.01); *G06F 9/5027* (2013.01)

(58) Field of Classification Search
    CPC .................................................. G06F 9/5027
    (Continued)

(56) References Cited

U.S. PATENT DOCUMENTS 8,725,886 B1    5/2014  Pulier et al.
9,294,236 B1 *  3/2016  Ward, Jr. .................. H04L 1/20
(Continued)

FOREIGN PATENT DOCUMENTS

WO    2014118792 A1    8/2014

OTHER PUBLICATIONS

"Amazon CloudWatch FAQs"; Amazon(TM) Web Services website (aws.amazon.com) as captured by the Wayback Machine on Feb. 15, 2015.*

(Continued)

*Primary Examiner* — Qing Chen
*Assistant Examiner* — Clint Thatcher
(74) *Attorney, Agent, or Firm* — Kevin Kehe

(57) ABSTRACT

Disclosed aspects include managing resources of a shared pool of configurable computing resources having a particular shared pool resource. An application program is run for processing on the shared pool of configurable computing resources. A set of resource data for the application program is collected by the application program. An offer of the particular shared pool resource for use by the application program is detected by the application program. The set of resource data associated with the particular shared pool resource is analyzed by the application program. Based on the set of resource data and in response to analyzing the set of resource data associated with the particular shared pool resource, the application program determines to refuse the offer. In response to determining to refuse the offer, the application program selects to refuse the offer.

20 Claims, 5 Drawing Sheets

(58) Field of Classification Search
USPC .................................................. 718/104
See application file for complete search history.

(56) References Cited

U.S. PATENT DOCUMENTS

| | | | | |
|---|---|---|---|---|
| 9,349,144 | B1* | 5/2016 | Allen | G06Q 30/08 |
| 2006/0242641 | A1* | 10/2006 | Kinsey | G06F 9/5077 |
| | | | | 718/1 |
| 2012/0304188 | A1* | 11/2012 | Balmin | G06F 9/5077 |
| | | | | 718/104 |
| 2013/0160008 | A1* | 6/2013 | Cawlfield | G06F 9/45558 |
| | | | | 718/1 |
| 2013/0205027 | A1 | 8/2013 | Abuelsaad et al. | |
| 2013/0304903 | A1* | 11/2013 | Mick | H04L 43/0817 |
| | | | | 709/224 |
| 2014/0067496 | A1* | 3/2014 | Buswell | G06Q 30/08 |
| | | | | 705/14.4 |

OTHER PUBLICATIONS

Amazon CloudWatch—Cloud & Network Monitoring Services, <http://aws.amazon.com/cloudwatch/>.

Han, Rui et al., Lightweight Resource Scaling for Cloud Applications, <http://www.doc.ic.ac.uk/~rh1910/papers/Lightweight_Resource_Scaling_for_Cloud_Applications.pdf>.

IBM Knowledge Center—User defined plug-in for hypervisor host metrics, <http://www-01.ibm.com/support/knowledgecenter/SS8MU9_2.2.0/Admin/concepts/userdefinedmetrics.dita>.

Mell, Peter et al., The NIST Definition of Cloud Computing, National Institute of Standards and Technology, Oct. 7, 2009, Version 15, NIST, Gaithersburg, MD, US.

Bryant et al., "Managing Resources of a Shared Pool of Configurable Computing Resources", U.S. Appl. No. 14/657,218, filed Mar. 13, 2015.

List of IBM Patents or Patent Applications Treated as Related.

* cited by examiner

MANAGING RESOURCES OF A SHARED POOL OF CONFIGURABLE COMPUTING RESOURCES

BACKGROUND

This disclosure relates generally to computer systems and, more particularly, relates to managing resources of a shared pool of configurable computing resources. The amount of data that needs to be managed by enterprises is increasing. Management of resources may be desired to be performed as efficiently as possible. As data needing to be managed increases, the need for management efficiency may increase.

SUMMARY

Disclosed aspects include managing resources of a shared pool of configurable computing resources having a particular shared pool resource. An application program is run for processing on the shared pool of configurable computing resources. A set of resource data for the application program is collected by the application program. An offer of the particular shared pool resource for use by the application program is detected by the application program. The set of resource data associated with the particular shared pool resource is analyzed by the application program. Based on the set of resource data and in response to analyzing the set of resource data associated with the particular shared pool resource, the application program determines to refuse the offer. In response to determining to refuse the offer, the application program selects to refuse the offer.

In embodiments, the shared pool of configurable computing resources has a shared pool manager. In various embodiments, a direct connection is established between the application program and the shared pool manager to communicate with respect to resource offerings. Data flow may be facilitated by limiting a number of hops on the direct connection to a threshold value. In certain embodiments, the application program transmits to the shared pool manager a data value. The data value may indicate the offer is declined or provide information with respect to an acceptable offer.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
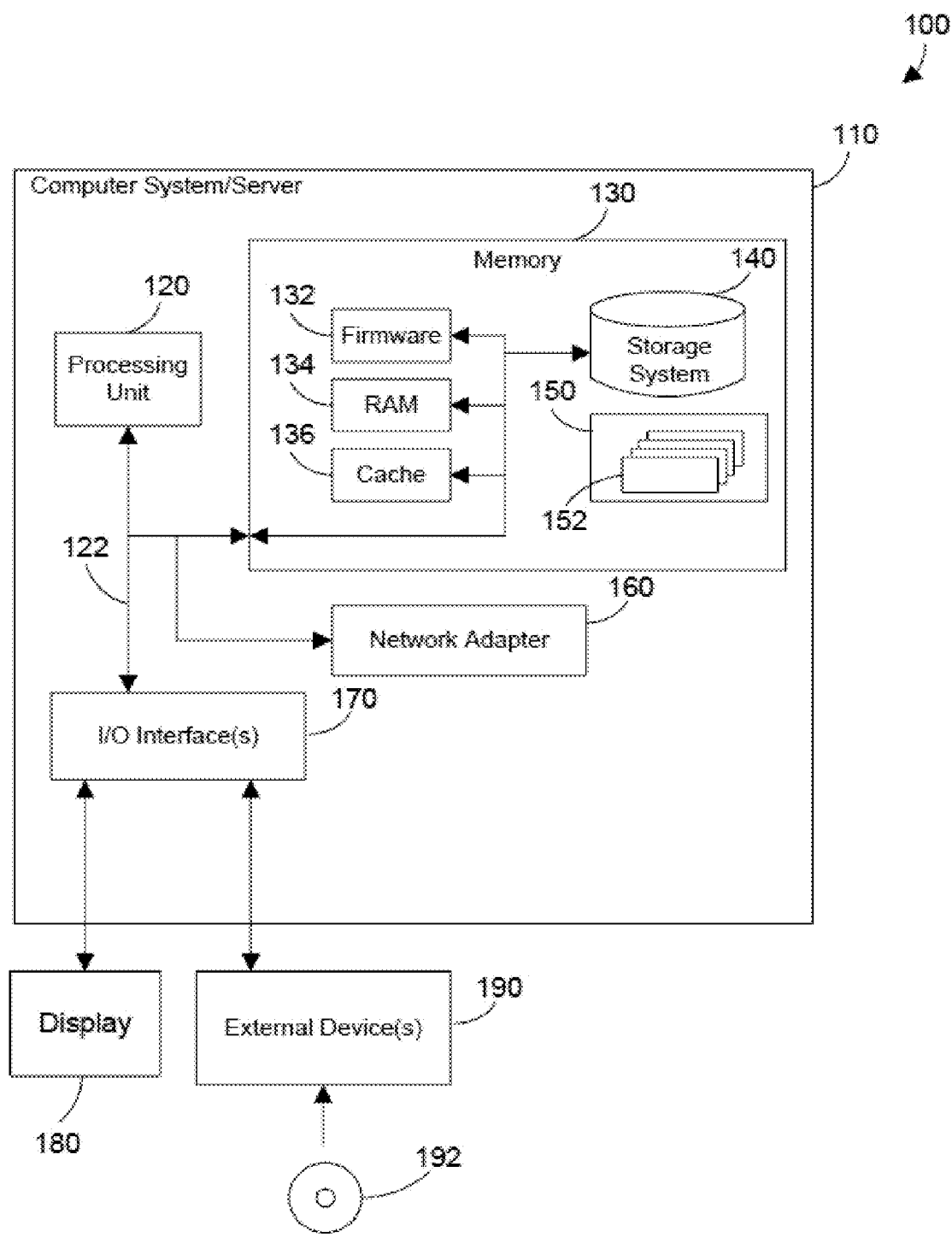
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include an application (or process) running in an instance indicating to a cloud environment its need for resources (e.g., processing, storage, networking). The application can, for example, indicate it needs a resource, will need a resource, or no longer needs a resource. The cloud environment can respond using a cloud manager to adjust resource allocation for a set of virtual machines. In particular, a running application can communicate to the cloud manager a refusal of a resource because the application does not need the resource. As such, an application program that consumes resources can communicate (e.g., request and release resources) directly with the cloud manager. Performance or efficiency benefits can result from participation of the application itself in resource management.

In embodiments, aspects of the disclosure join the application program communicating to the cloud manager regarding resource utilization (including future projections) with the cloud manager allocating/deallocating resources to the instance having the application program. Features include the ability for an application to communicate its resource needs (both positive and negative) directly to the cloud manager. Such direct connection may positively impact challenges associated with using a separate agent and allows for the application, which can efficiently analyze details about the application's resource usage, to anticipate future resource adjustments.

Aspects of the disclosure include a method, system, and computer program product for managing resources of a shared pool of configurable computing resources. The shared pool of configurable computing resources includes a particular shared pool resource (e.g., processing, memory, bandwidth). Aspects include running (e.g., initiating) an application program for processing on the shared pool of configurable computing resources. In response to running the application program, a set of resource data for the application program is collected by the application program. An offer of the particular shared pool resource for use by the application program is detected by the application program. The set of resource data associated with the particular shared pool resource is analyzed by the application program. In response to analyzing the set of resource data associated with the particular shared pool resource, the application program determines to refuse the offer based on the set of resource data. In response to determining to refuse the offer, the application program selects to refuse the offer.

In embodiments, the shared pool of configurable computing resources has a shared pool manager. In various embodiments, a direct connection is established between the application program and the shared pool manager to communicate with respect to resource offerings. Data flow may be facilitated by limiting a number of hops on the direct connection to a threshold value. In certain embodiments, the application program transmits to the shared pool manager a data value. The data value may indicate the offer is declined or provide information with respect to an acceptable offer.

Aspects of the disclosure include the set of resource data having at least one of a historical component, a contemporary component, or a predictive component. The historical component may indicate a past resource statistical value. The contemporary component can indicate a current resource value. The predictive component may indicate a future resource expectation value. A variety of permutations and combinations of such components are considered.

In embodiments, determining to refuse the offer includes a set of operations. For example, based on the set of resource data, a target offer value for the particular shared pool resource can be calculated. An offered resource value for the particular shared pool resource may be extracted from the offer. Subsequently, a comparison is made between the offered resource value and the target offer value. In response to comparing the offered resource value with the target offer value, it may be determined that the offered resource value fails to meet the target offer value. Thus, the set of operations are used to determine to refuse the offer. Altogether, aspects of the disclosure include the application program proactively deterring a resource allocation overreaction when the application program is running and provide a methodology for managing resources that may deliver performance or efficiency benefits.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
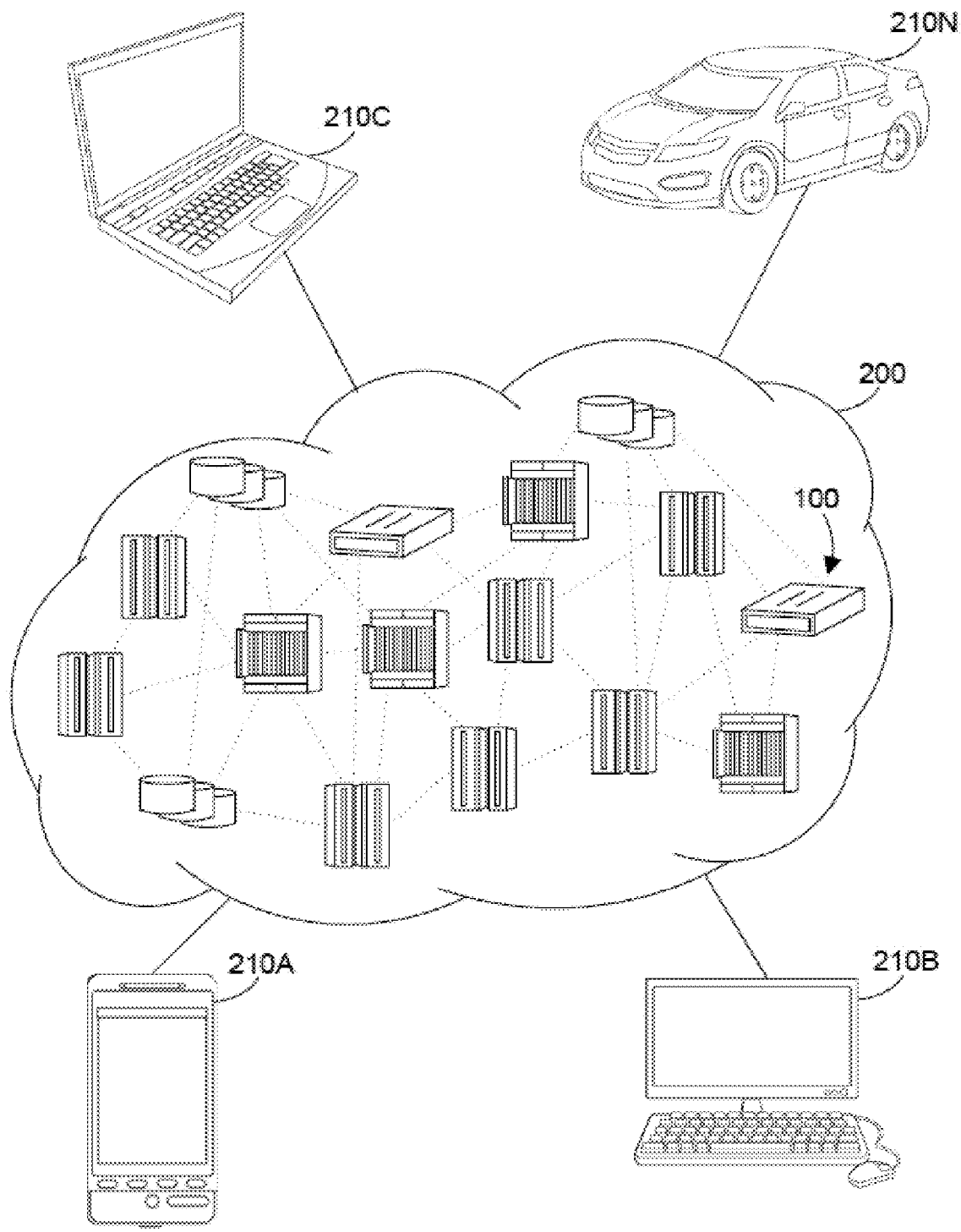
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
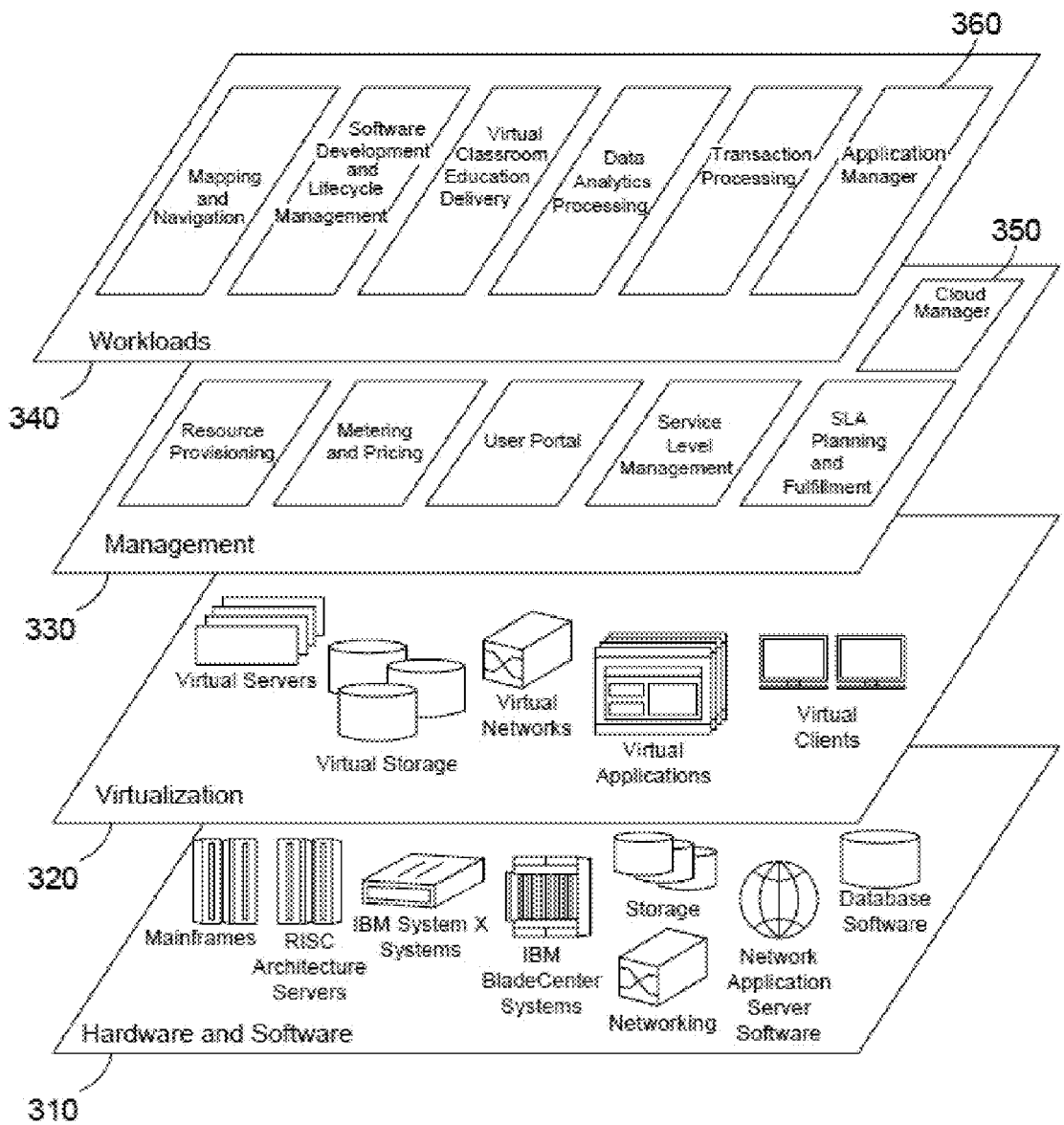
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an application manager 360, as discussed in more detail below.

Figure 4:
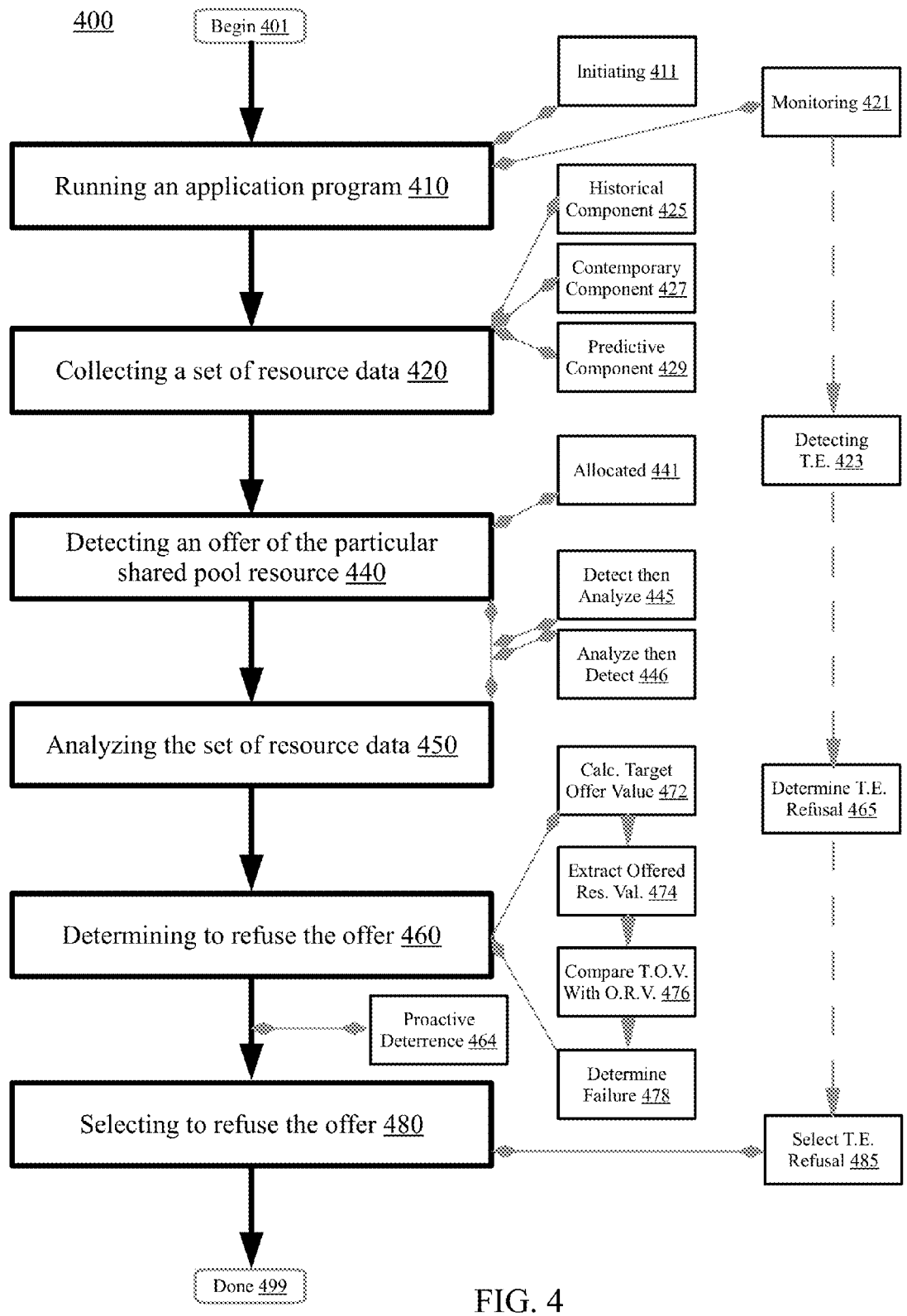
FIG. 4 is a flowchart illustrating a method for managing resources of a shared pool of configurable computing resources according to embodiments.

FIG. 4 is a flowchart illustrating a method 400 for managing resources of a shared pool of configurable computing resources according to embodiments. The shared pool of configurable computing resources includes a particular shared pool resource. Aspects of method 400 may include an application program directly refusing the particular shared pool resource from the shared pool of configurable computing resources in an efficient manner for performance. Method 400 begins at block 401.

At block 410, the application program runs (e.g., is initiated at block 411, is executed, is executing, is processing). The application program is for processing on the shared pool of configurable computing resources. For example, the application program may be distributed among one or more virtual machines in a cloud environment. In embodiments, subsequent to running/initiating the application program, a set of resource data for the application program may be monitored at block 421. Such monitoring may occur without using a separate monitoring agent.

At block 420, the application program collects a set of resource data for the application program. Collecting the set of resource data occurs in response to running the application program. The collecting may occur in a volatile memory which can be accessed/monitored efficiently by the application program. In embodiments, the set of resource data collected may have been saved in a multi-dimensional array or database. In embodiments, subsequent to collecting the set of resource data for the application program, the set of resource data may be monitored (e.g., by the application program and not by a separate agent). In embodiments, a triggering event may be detected at block 423. The triggering event can include a specific value of the set of resource data reaching a threshold. For example, the triggering event may occur when the rate of increase of memory usage flattens (e.g., is not increasing or is decreasing as it reaches the threshold of zero). In embodiments, the triggering event can include benchmarks of data phases or computational phases (e.g., anticipating beginning of a phase, anticipating ending of a phase, anticipating ramping-up of a phase).

In embodiments, the set of resource data has at least one of a historical component 425, a contemporary component 427, or a predictive component 429. The historical component 425 may indicate a past resource statistical value (e.g., statistical averages, standard deviations, or quintiles/quartiles for memory/processor usage/allocation over time). The contemporary component 427 can indicate a current resource value (e.g., current status information for virtual machine usage by the application program, completion status of data currently being processed such as nearly complete). The predictive component 429 may indicate a future resource expectation value (e.g., a forecast for upcoming near-term/long-term resource usage, near-term memory usage is expected to fall because gathering of data is nearly complete). A variety of permutations and combinations of such components are considered.

At block 440, the application program detects/receives an offer of the particular shared pool resource. The particular shared pool resource is for use by the application program. For example, the offer may be a data packet including specifications for the particular shared pool resource which are designated for use by the application program. The data packet may be wrapped such that only the application program can unwrap it. In embodiments, the offer of the particular shared pool resource for use by the application program includes an allocation at block 441 of the particular shared pool resource for use by the application program. For instance, the resources have already been allocated and are available for use on-demand, in real-time, or without transmitting anything from the application program to an originator of the offer.

At block 450, the application program analyzes the set of resource data associated with the particular shared pool resource. For instance, analyzing can include extracting (e.g., creating a derivation), examining (e.g., performing an inspection), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure for further use. For example, when the particular shared pool resource includes a memory allocation, a memory-oriented subset of the set of resource data is analyzed.

In embodiments, at block 445 analyzing the set of resource data associated with the particular shared pool resource may occur in response to detecting the offer of the particular shared pool resource for use by the application program. For example, the offer is detected/received and subsequently the set of resource data is analyzed (e.g., based on contents of the offer). In embodiments, at block 446 detecting the offer of the particular shared pool resource for use by the application program can occur in response to analyzing the set of resource data associated with the particular shared pool resource. For example, the set of resource data is analyzed (e.g., in anticipation of a set of offers) and subsequently the offer is detected (e.g., with a specific offer have particular features/components/contents).

At block 460, in response to analyzing the set of resource data associated with the particular shared pool resource, the application program determines to refuse the offer based on the set of resource data. In embodiments, the application program makes the determination without interaction—with or intervention—by a separate agent. In embodiments, in response to detecting the triggering event for the set of resource data, the application program determines to refuse resource offerings related to the triggering event at block 465. For example, when the triggering event includes a directional turn of a rate of processor usage (e.g., a rate of processing-resource usage was increasing but is now decreasing), offerings of more processing resources may be determined to be refused.

In embodiments, determining to refuse the offer includes a set of operations (e.g., blocks 472, 474, 476, 478). For example, based on the set of resource data, a target offer value for the particular shared pool resource can be calculated at block 472 (e.g., 0 GB memory). An offered resource value for the particular shared pool resource may be extracted from the offer at block 474 (e.g., 6 GB memory). Subsequently, at block 476 a comparison is made between the offered resource value and the target offer value. In response to comparing the offered resource value with the target offer value, at block 478 it may be determined that the offered resource value fails to meet the target offer value (e.g., the application program does not want/need memory so offering it failed to meet the application program's needs).

At block 480, in response to determining to refuse the offer, the application program selects to refuse the offer. In embodiments, in response to determining to refuse resource offerings related to the triggering event, the application program may select at block 485 to refuse resource offerings related to the triggering event. Selecting can include, for example, storing a data value (e.g., entering a digit/character in a database), transmitting a data object (e.g., sending a file having metadata), routing a message (e.g., publishing a shut-down expectation), or providing/performing/processing an operation (e.g., a notification).

Method 400 concludes at block 499. Aspects of method 400 may provide performance or efficiency benefits for managing resources of a shared pool of configurable computing resources. For example, as at block 464, aspects of method 400 can proactively deter/prevent a resource allocation overreaction (e.g., allocation/receipt of unneeded/inefficiently-used resources) when the application program is running.

Figure 5:
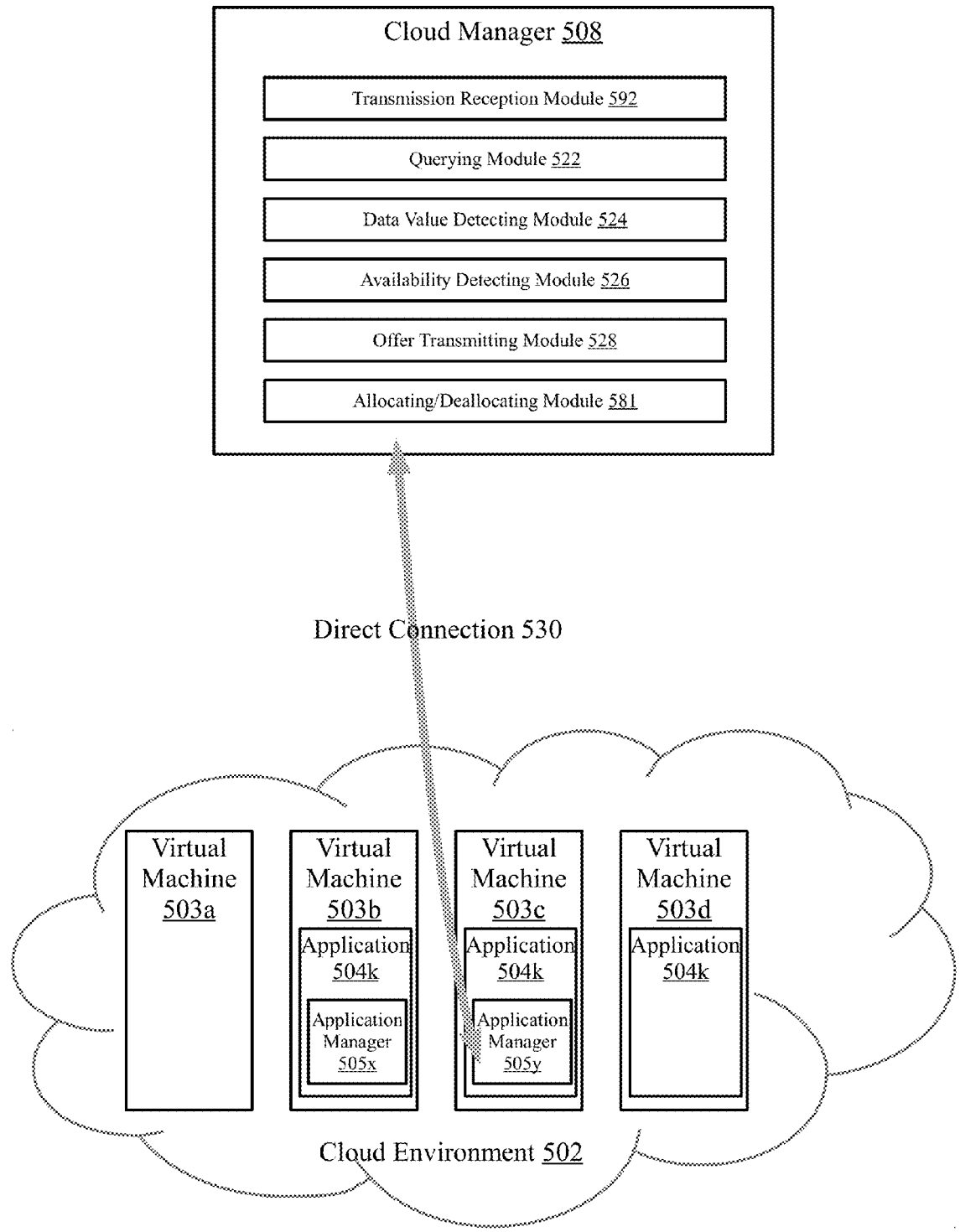
FIG. 5 shows a system for managing resources of a shared pool of configurable computing resources according to embodiments.

FIG. 5 shows a system 500 for managing resources of a shared pool of configurable computing resources including a particular shared pool resource (e.g., components related to a virtual machine) according to embodiments. In embodiments, method 400 may be implemented in an application 504$k$ running on a virtual machine 503$a$/b/c/d using a module such as an application manager 505$x/y$ in a cloud environment 502. As such, aspects of the discussion related to FIG. 4 and method 400 may be used/applied/implemented in the system 500. Application manager 505$x/y$ may be implemented in hardware, software or firmware executable on hardware, or a combination thereof in application 504$k$.

The shared pool of configurable computing resources (e.g., cloud environment 502) may have a shared pool manager (e.g., cloud manager 508). The cloud manager 508 can include at least one of a transmission reception module 592, a querying module 522, a data value detecting module 524, an availability detecting module 526, an offer transmitting module 528, or an allocating/deallocating module 581. The cloud manager 508 can provision/deprovision resources without user intervention. In embodiments, the cloud manager 508 can have a (graphical) user interface that allows a user to interact with the cloud manager 508 to perform any suitable function, including provisioning of virtual machines, destruction of virtual machines, performance analysis of the cloud, etc. Of course, cloud manager 508 could include many other features and functions known in the art that are not shown in FIG. 5.

Direct connection 530 links the cloud manager 508 with the application 504$k$ (illustrated using application manager 505$y$). In embodiments such as the one illustrated, a separate agent is not used (e.g., a separate agent to monitor the application 504$k$). The application 504$k$ can have a better computational understanding of its resource requirements than would a separate agent. Establishing the direct connection 530 allows for communication with respect to resource offerings (e.g., between the application 504$k$ and the cloud manager 508). As such, data flow may be facilitated/streamlined by limiting a number of hops on the direct connection to a threshold value. For example, without having to hop to (e.g., stop at) a separate agent, data flow may have a higher velocity (e.g., more data flows quicker) than when using a separate agent. In a certain embodiment, the threshold value may be one hop which may result in one possible data packet transmission—from the application 504$k$ (using application manager 505$y$) directly to the cloud manager 508 without any intervening stops.

The transmission reception module 592 can include receiving (e.g., detecting, subscribing to) a transmission, from the application program (e.g., application 504$k$) to the shared pool manager (e.g., cloud manager 508), that includes a data value which indicates the offer is declined (e.g., 0, no, #notnow, maybe later). In embodiments, the transmission reception module 592 can receive a transmission that includes a data value for which the offer would be accepted (e.g., 1 GB memory for one hour with an option to extend by 30 minutes). Performance or efficiency benefits may be realized by having such a dedicated module within the cloud manager 508.

The querying module 522 can query the application 504$k$ for a resource usage opportunity. For example, submitting a question to the application 504$k$ to inquire if the application 504$k$ needs or could use additional resources. The data value detecting module 524 may detect, in response to querying the application 504$k$ for the resource usage opportunity, a data value which indicates actuality of the resource usage opportunity. For example, detecting the application 504$k$ could use more processing power based on a result of the question/inquiry (e.g., by receiving a response having an explicit—"yes, ramp up now please"—or implicit—"it could help"—desire for processing resources).

The availability detecting module 526 can detect, in response to monitoring the particular shared pool resource for availability, availability of the particular shared pool resource. For example, the cloud manager 508 monitors the particular shared pool resource for availability and the availability detecting module 526 recognizes/identifies the particular shared pool resource is available (e.g., processing power is free for assignment, memory is open for utilization). The offer transmitting module 528 transmits/sends (to the running application program such as application 504k) the offer of the particular shared pool resource for use by the application 504k. For example, sending the offer of 6 GB of memory on a specified virtual machine (such as 503a) to the application 504k.

The allocating/deallocating module 581 may allocate or deallocate the particular shared pool resource. Such allocation/deallocation can be for the application 504k. For instance, allocation may happen in response to detecting availability of the shared pool resource or in conjunction with the offer. For example, deallocation can occur in response to detecting refusal of the offer. Aspects of system 500 may provide performance or efficiency benefits for managing resources of a shared pool of configurable computing resources. For example, aspects of system 500 can proactively deter/prevent a resource allocation overreaction (e.g., allocation/receipt of unneeded/inefficiently-used resources) when the application program is running.

Consider the illustrative example that follows. In a cloud or a resource-on-demand environment, system resources may become available. Available resources such as new disks, new memory, or new central processing units are made available quickly. A cloud manager distributes resources appropriately within the cloud. Such distribution of resources may be positively impacted by participation of the running application. In certain cases, a running application may communicate to the cloud manager a refusal (e.g., "no thanks") to a given resource.

Aspects of the disclosure allow a cloud manager to communicate (e.g., inquire upon needs) to running applications or processes. Communication between the running application and the cloud manager can be accomplished using a Representational State Transfer Application Program Interface (REST API). The REST API may allow the cloud manager to query vital statistics to determine if a resource is needed. To illustrate, stream computing is a technology that utilizes distributed computing techniques and may be well-served by such features.

A stream computing application may be deployed across a cluster of nodes. The stream computing application is broken up into many parts called processing elements. Each processing element may have at least one operator and constitute one Linux process. As one of these processing elements has an internal data structure that grows, only the application may detect when the internal data structure will stop growing. As such, the stream computing application could set a processing element metric indicating when the internal data structure will stop growing. For example, a parameter such as MemoryNeeded="NO" could be set when the stream computing application determines no internal structures will be growing.

Metrics that can be accessed by the cloud manager can be gathered at the operator level, processing element level, application level, job level, or system level. Metrics being looked at need not be as simple as "yes/no"-type inquiries but can be more elaborate. For instance, they can be hints into how much more of a particular resource might be needed. They can include time boundaries as to when the application expects a given resource will be needed. They can contain hints as to how much faster a particular part of the operator graph can execute if more resource is allocated. When more resources are made available, a more advanced approach could be used to coordinate priority assignment between applications. For example, even though both Application A and Application B currently do not need extra resources, based on prior history, Application A is predicted to have a heavier data load within the next 24 hours. Therefore, Application A could be assigned a higher priority value. Altogether, aspects of the disclosure may provide performance or efficiency benefits to applications such as the stream computing application described.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud-computing resources may be provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing resources of a shared pool of configurable computing resources including a particular shared pool resource, the system comprising:
   a memory having a set of computer readable computer instructions, and
   a processor for executing the set of computer readable instructions, the set of computer readable instructions including:
   running, for processing on the shared pool of configurable computing resources, an application program;
   collecting, by the application program in response to running the application program, a set of resource data for the application program;
   detecting, by the application program, an offer of the particular shared pool resource for use by the application program;
   analyzing, by the application program, the set of resource data associated with the particular shared pool resource;
   determining, by the application program based on the set of resource data in response to analyzing the set of resource data associated with the particular shared pool resource, to refuse the offer; and
   selecting, by the application program in response to determining to refuse the offer, to refuse the offer, wherein selecting to refuse the offer includes:
   transmitting, by the application program, a data value for which the offer would be accepted.

2. The system of claim 1, wherein the shared pool of configurable computing resources has a shared pool manager, and further comprising:
   establishing, between the application program and the shared pool manager, a direct connection to communicate with respect to resource offerings.

3. The system of claim 2, further comprising facilitating data flow by limiting a number of hops on the direct connection to a threshold value.

4. The system of claim 1, wherein the shared pool of configurable computing resources has a shared pool manager, and wherein selecting to refuse the offer includes:
   transmitting, by the application program to the shared pool manager, the data value which indicates the offer is declined.

5. The system of claim 1, wherein the shared pool of configurable computing resources has a shared pool manager, and further comprising:
   querying, by the shared pool manager, the application program for a resource usage opportunity; and
   detecting, by the shared pool manager in response to querying the application program for the resource usage opportunity, the data value which indicates actuality of the resource usage opportunity.

6. The system of claim 1, wherein the shared pool of configurable computing resources has a shared pool manager, and further comprising:
   detecting, by the shared pool manager in response to monitoring the particular shared pool resource for availability, availability of the particular shared pool resource; and
   transmitting, by the shared pool manager in response to running the application program, the offer of the particular shared pool resource for use by the application program.

7. The system of claim 1, wherein the offer of the particular shared pool resource for use by the application program includes an allocation of the particular shared pool resource for use by the application program.

8. The system of claim 7, wherein the shared pool of configurable computing resources has a shared pool manager, and further comprising:
   deallocating, by the shared pool manager in response to detecting refusal of the offer, the particular shared pool resource with respect to the application program.

9. The system of claim 1, wherein determining to refuse the offer includes:
   calculating, based on the set of resource data, a target offer value for the particular shared pool resource;
   extracting, from the offer, an offered resource value for the particular shared pool resource;
   comparing, in response to both extracting the offered resource value and calculating the target offer value, the offered resource value with the target offer value; and
   determining, in response to comparing the offered resource value with the target offer value, the offered resource value fails to meet the target offer value.

10. The system of claim 1, wherein the set of resource data includes:
    a historical component to indicate a past resource statistical value;
    a contemporary component to indicate a current resource value; and
    a predictive component to indicate a future resource expectation value.

11. The system of claim 1, wherein analyzing the set of resource data associated with the particular shared pool resource occurs in response to detecting the offer of the particular shared pool resource for use by the application program.

12. The system of claim 1, wherein detecting the offer of the particular shared pool resource for use by the application program occurs in response to analyzing the set of resource data associated with the particular shared pool resource.

13. The system of claim 1, further comprising:
monitoring, by the application program in response to running the application program, the set of resource data for the application program;
detecting, by the application program using the set of resource data in response to monitoring the set of resource data for the application program, a triggering event;
determining, by the application program in response to detecting the triggering event for the set of resource data, to refuse resource offerings related to the triggering event; and
selecting, by the application program in response to determining to refuse resource offerings related to the triggering event, to refuse resource offerings related to the triggering event.

14. A computer program product for managing resources of a shared pool of configurable computing resources including a particular shared pool resource, the computer program product comprising a computer readable storage medium having program instructions embodied therewith, wherein the computer readable storage medium is not a transitory signal per se, the program instructions executable by a processor to cause the processor to perform a method comprising:
running, for processing on the shared pool of configurable computing resources, an application program;
collecting, by the application program in response to running the application program, a set of resource data for the application program;
detecting, by the application program, an offer of the particular shared pool resource for use by the application program;
analyzing, by the application program, the set of resource data associated with the particular shared pool resource;
determining, by the application program based on the set of resource data in response to analyzing the set of resource data associated with the particular shared pool resource, to refuse the offer; and
selecting, by the application program in response to determining to refuse the offer, to refuse the offer, wherein selecting to refuse the offer includes:
transmitting, by the application program, a data value for which the offer would be accepted.

15. The computer program product of claim 14, wherein the program instructions are stored in a computer readable storage medium in a data processing system, and wherein the program instructions were downloaded over a network from a remote data processing system.

16. The computer program product of claim 14, wherein the program instructions are stored in a computer readable storage medium in a server data processing system, and wherein the program instructions are downloaded over a network to a remote data processing system for use in a computer readable storage medium with the remote data processing system.

17. The system of claim 1, wherein the data value for which the offer would be accepted indicates a counteroffer.

18. The system of claim 17, wherein the counteroffer would be agreed-to by the application program.

19. The system of claim 1, further comprising:
determining, by the application program, the data value for which the offer would be accepted.

20. The system of claim 1, wherein the data value includes a target offer value for the particular shared pool resource.

* * * * *